United States Patent Office 3,582,389
Patented June 1, 1971

3,582,389
METHOD FOR METALLIZING PHOSPHOR SCREENS
Theodore A. Saulnier, Lancaster, Pa., assignor to RCA Corporation
No Drawing. Filed Dec. 26, 1967, Ser. No. 693,058
Int. Cl. H01j 31/20
U.S. Cl. 117—33.5
9 Claims

ABSTRACT OF THE DISCLOSURE

A method for metallizing a phosphor screen, as for a cathode ray tube, including the steps of producing upon the surface of the phosphor screen a volatilizable substrate in the form of a resin film from an aqueous filming emulsion consisting essentially of an acrylate copolymer, evaporating metal upon the substrate to form a metal layer thereon, and then volatilizing the substrate. In the disclosed method, the filming emulsion contains at least one of (1) a neutralizing agent in sufficient quantity to adjust the emulsion to a pH in the range of 4.0 to 8.0, (2) a boric acid complex of polyvinyl alcohol in an amount up to about 1.0 weight percent of the acrylate solids present in the emulsion, (3) colloidal silica in an amount up to about 25 weight percent of the weight of acrylate solids present in the emulsion, and (4) soluble silicate in an amount up to about 2 weight percent of the acrylate solids present in the emulsion.

BACKGROUND OF THE INVENTION

A process for metallizing a phosphor screen for a cathode ray tube is described in U.S. Pat. No. 3,067,055 to Theodore A. Saulnier, Jr. That process includes the step of forming upon the surface of the phosphor screen a volatilizable substrate in the form of a film of organic material. This step is referred to as filming. In that patent, the film is formed from an aqueous emulsion consisting essentially of an acrylate copolymer. Some of the emulsions described in that patent normally have a pH in the range of 2.8 to 3.2. That previous process using emulsions with a pH in this acid range as well as other pH ranges is quite effective in achieving the objectives of that patent.

Under some manufacturing conditions, these previously described emulsions do not wet the phosphor screen well enough to spread the emulsion rapidly across the surface of the screen with the required uniformity and reproducibility for rapidly indexed manufacturing equipment. This is particularly acute with production equipment for manufacturing color television picture tubes which operate at short rapid index rates. Also, some portions of the phosphor screen are comprised of areas whose texture is too coarse and whose surface is too hydrophobic to permit the filming emulsion to flow evenly over the screen and to fill the rough texture and the capillaries of the screen so that the desired uniformity is achieved. Areas of europium-activated yttrium oxysulfide phosphor frequently exhibit such a problem.

Another problem is that some phosphors which are sometimes used in phosphor screens tend to hydrolyze in water to form alkaline solutions. Some phosphors of this type are europium-activated yttrium oxide $Y_2O_3$:Eu, europium-activated gadolinium oxide $Gd_2O_3$:Eu, and europium-activated lanthanum oxide $La_2O_3$:Eu. When filming a screen containing such a phosphor with a previous aqueous filming emlusion, the spreading properties of the emulsion may be altered sufficiently to adversely affect its performance in rapidly indexed manufacturing processing. The hydrolysis of such phosphors in water to form alkaline solutions may also adversely affect the luminescent light output efficiency of the phosphor, particularly when the emulsion is strongly acid.

Another problem arises from the fact that the organic film and the metallizing thereon extends beyond the phosphor screen and onto the bare glass inner surface of the faceplate of the cathode ray tube. Usually, the film and the metallizing extend up the sidewall of the faceplate. At least because of the different character of the glass surface and because of the curvature and orientations of the glass surfaces, the film may blister during the subsequent baking-out step during which the film is volatilized. Also, the metallizing may peel from the glass surface after the film is volatilized.

SUMMARY OF THE INVENTION

The novel processes described herein reduce or overcome the above-cited difficulties with the previous aqueous filming emulsions of acrylate copolymers by including in the emulsion at least one of the following:

(1) A neutralizing agent in sufficient quantity to adjust the pH of said emulsion to a pH in the range of 4.0 to 8.0;

(2) A boric acid complex of polyvinyl alcohol in an amount up to about 1.0 weight percent of the acrylate solids present in said emulsion;

(3) Colloidal silica in an amount up to about 25 weight percent of the acrylate solids present in said emulsion; and (4) Soluble silicate in an amount up to about 2 weight percent of the acrylate solids present in said emulsion.

The novel process includes the steps of filming the phosphor screen with the aqueous emulsion, evaporating a metal layer upon the film, and then volatilizing the organic matter in the film.

One effect of the pH adjustment through adding a neutralizing agent is to increase the wettability of the screen with respect to the filming emulsion. This increased wettability permits the emulsion to spread rapidly and evenly over the screen surface and into the interstices between the particles which constitute the screen. The pH adjustment to the emulsion also reduces the hydrolysis of the phosphor particles to form alkaline solutions where that is the tendency of the phosphor. As a result, there are markedly fewer nonuniformities and inhomogeneities in the volatilizable substrate produced.

The principal effect of the presence of the boric acid complex of polyvinyl alcohol is to reduce the blistering of the film over bare glass areas during the baking-out step. The principal effect of the presence of the colloidal silicia and/or the soluble silicate in the emulsion is to improve the adherence of the metallizing to the glass and thereby reduce peeling of the metallizing subsequent to the baking-out step. However, these functions are not mutually exclusive and both the silica and the silicate reduce blistering and peeling to some extent.

The additives may be present singly or in any combination thereof. Also, a single material may perform more than one function. For example, an addition may, at once, be a neutralizing agent and also provide colloidal silica to the emulsion.

DESCRIPTION OF THE PREFERRED EMBODIMENTS

In all of the examples, the slurry techniques is employed to apply the emulsion to a previously dried tricolor mosaic screen for a color television picture tube. This screen consists of phsphor dots arranged in a hexagonal pattern on the surface of a glass faceplate. The phosphor screen is comprised of dots of a blue-emitting phosphor (e.g., zinc sulfide activated with silver); dots of a green-emitting phosphor (e.g., zinc cadmium sulfide activated with silver); and dots of a red-emitting phosphor (e.g., yttrium oxysulfide activated with europium). The dots contain about 8 to 20 percent of a light-hardened binder comprised principally of polyvinyl alcohol and acrylate copolymers.

Starting with a rectangular 25-inch screened faceplate panel or cap for a color television picture tube, the procedure is as follows:

(1) Place the screened faceplate panel open end up upon an automatic slurry spinner. The slurry spinner is similar in function to the one described in U.S. Pat. No. 2,902,973 to M. Weingarten et al.

(2) Preheat the dried screened panel to about 40–46° C. with ridiant heaters with the panel open end up and about horizontal (referred to herein as about a 0° angle).

(3) Start slow rotation (about 20 r.p.m.) and while the rotation continues dispense about 1000 milliliters of the filming emulsion onto the central area of the phosphor screen surface without producing foam or bubbles.

(4) Continue rotation at about 15 to 22 r.p.m. and tilt the cap to about 15 to 18° from horizontal to cause the emulsion puddle to spiral over the screen surface to the cap edge without leaving dry areas.

(5) Slow the cap rotation to about 7.5 to 8.5 r.p.m. in order to coat the corners of the rectangular panel while the cap is tilted at about 15° to 18° from horizontal.

(6) Once the panel corners are coated, tip the cap quickly (about 3 to 6 seconds) to an angle of 90° to 110° with the horizontal while rapidly accelerating the cap rotation to a high speed to throw off excess emulsion from the cap and to level the coating. A speed of about 120 r.p.m. is effective for this purpose.

(7) Slow the cap rotation to about 50 r.p.m. for about 15 seconds and then to about 30 r.p.m. for about one second. During this latter slower rotation, apply radiant heat to dry the coating on the phosphor screen and to form the film.

(8) Direct a jet of water so as to rinse only the excess coating off the sidewalls of the faceplate panel during the drying cycle and/or before the film is formed.

(9) Remove the cap from the spinner and place it screen side down on a metallizing apparatus. Then, evaporate aluminum metal in vacuum upon the resin film.

(10) Remove the faceplate from the metallizing apparatus and continue the normal processing including a subsequent step of baking the faceplate panel in air at about 420° C. to volatilize the resin film and to leave the aluminum metal layer upon the phosphor screen.

The filming emulsions for the novel process are aqueous emulsions of acrylate copolymers to which have been added one or more of the additives mentioned above. The filming emulsion formualtions for the specific examples described below may be prepared with the following stock solutions:

Solution A—.An aqueous emulsion containing about 20 weight percent of a copolymer of methacrylate esters and methacrylic acid dispersed in water and having a pH of about 2.9. One such emulsion my be prepared by mixing water with Rhoplex B–74 (marketed by Rohm & Haas Co., Philadelphia, Pa.) to the required resin concentration. This emulsion has an average particle size of about 0.1 micron.

Solution B.—An aqueous solution containing about 5 weight percent of a boric acid complex of polyvinyl alcohol. One such solution may be prepared by mixing a sufficient quantity of Unisize HA70 (marketed by Air Reduction Company, New York, N.Y.) with water to provide the required concentration.

Solution C.—An aqueous solution containing about 16 weight percent potassium silicate. One such solution may be prepared by mixing sufficient Kasil No. 1 (marketed by Philadelphia Quartz Co., Philadelphia, Pa.) with water to provide the required concentration. This solution has a ratio of $SiO_2/K_2O$ of about 2.5, and a pH of about 11.5.

Solution D.—An aqueous solution containing about 15 weight percent of colloidal silica particles. One such solution may be prepared by mixing sufficient Ludox (marketed by E. I. du Pont de Nemours, Wilmington, Del.) with water to provide the required concentration. The particles in this solution have an average particle size of about 15 millimicrons.

Example 1

Markedly improved spreading properties are achieved by neutralizing with ammonium hydroxide an aqueous filming emulsion of an acrylate copolymer which normally has a pH of less than 4.0. The following formulation used in the above-described filming process is illustrative.

To 50 volume parts Solution A, add a sufficient volume of 28 weight percent ammonium hydroxide to adjust the pH of the emulsion to about 7.2. Then, add sufficient water (pH about 7.0) to raise the volume to a total of 100 volume parts of filming emulsion.

Example 2

Markedly improved spreading properties are also achieved by neutralizing with morpholine an aqueous filming emulsion of an acrylate copolymer which normally has a pH of less than 4.0. The following formulation used in the above-described filming process is illustrative.

To 50 volume parts of Solution A, add a sufficient volume of morpholine to adjust the pH of the emulsion to about 4.2. Then, add sufficient water (pH about 7.0) to raise the volume to 100 parts of filming emulsion.

Example 3

The following filming emulsion used in the above-described process is illustrative of a formulation which results in markedly lower blistering of the resin film during the baking-out step.

Mix one volume part Solution B with 49 volume parts water. Then, mix with this solution 50 volume parts Solution A. This formulation has a pH of about 3.5. It has been found desirable to apply somewhat more heat to the film during the drying step (8) with this formulation.

Example 4

The following filming emulsion used in the above-described process is illustrative of a formulation which results in markedly lower blistering of the film during baking-out and markedly lower peeling and flaking of the metallizing from over bare glass areas after the baking-out step.

Mix 0.5 volume part Solution C with 28.7 volume parts water. Then add to this mixture 40 volume parts Solution A. Separately mix 0.8 part Solution B with 25.0 parts water. Then, stir the mixture containing Solution A with the mixture containing Solutions A and C. Finally, mix in sufficient water to make 100 volume parts of filming emulsion.

Example 5

The following filming emulsion used in the above-described process is illustrative of a formulation that combines all three additives in a single formulation to achieve advantages in the spreading of the emulsion, in reduced blistering of the film, and in reduced peeling of the metal layer from bare glass areas.

The formulation is prepared by following the instructions of Example 4 except that after all of the solutions are combined and before the final addition of water is made, sufficient ammonium hydroxide is added to the mixture to adjust the pH of the mixture to about 7.2. Then, sufficient water is added to make 100 volume parts of filming emulsion.

The aqueous emulsions used in novel methods consist essentially of acrylate copolymers. By "acrylate copolymer" is meant copolymers which are constituted of combinations of alkyl acrylates, alkyl methacrylates, acrylic acid, methacrylic acid, and similar acrylate type monomers. Some suitable commercial aqueous emulsions of acrylates from which the filming emulsions can be made are marketed by Rohm & Haas Co., Philadelphia, as under the trademark Rhoplex and under the designations of B–74 (pH 2.5–3.0), B–85 (pH 9.5–10.0), C–72 (pH 7.5–8.0), and D–70 (pH 6.2–7.0). The content of acrylate copolymer in the filming emulsion may be in the range of about 5 to 15 weight percent of the emulsion.

A plasticizer may be used with the acrylate copolymer for the purpose of adjusting the hardness and film-forming characteristics of the film formed from the emulsion. Most of the usual plasticizers for acrylate copolymers may be used for this purpose. Some suitable plasticizers are dibutyl phthalate, butyl glycolate, methyl phthalate, tri-butoxyethyl phosphate, and ethyl glycolate. The content of plasticizer may be in the range of 0 to 10 weight percent of the weight of acrylate copolymer.

In the novel method, the filming emulsion preferably has a pH in the range of 4.0 to 8.0 where the emulsion ordinarily has a pH below this range, the pH may be raised by mixing into the emulsion a neutralizing reagent or a combination of neutralizing reagents. Solutions of sodium hydroxide, potassium hydroxide, and other inorganic alkali salts can be used where it is preferred to use a reagent that does not greatly increase the resistance of resin film to pyrolysis, and does not increase the inert ash residue in the screen. Ammonium hydroxide and morpholine have been found very satisfactory for adjusting the pH of an emulsion made with Rhoplex B–74. This is particularly effective for filming screens that are too hydrophobic to wet adequately in very short time cycles or automatic and semiautomatic manufacturing equipment.

An ammonium hydroxide-neutralized emulsion works well in a pH range of about 6.8 to 7.5. Higher pH's give satisfactory but not optimum coatings because the higher alkalinity leads to some swelling of the emulsion particles and complications in the drying and film-forming step.

A morpholine-neutralized emulsion performs best in a pH range of about 4.0 to 4.5. At higher phs, the emulsion appears to be swollen and/or partially plasticized by the increased morpholine content. The results suggest that other suitable amines or neutralizing reagents are useful under these and other pH ranges with optimum results.

A boric acid complex of polyvinyl alcohol may be included in the filming emulsion in an amount up to about 1.0 weight percent of the acrylate solids present in the emulsion. The preferred range is about 0.2 to 1.0 weight percent. Such a boric acid complex may be produced by reacting boric acid with polyvinyl alcohol in an acidic medium having a pH lower than about 5.5. In a typical preparation, an aqueous solution of boric acid is added to a 7 percent solution of polyvinyl alcohol buffered to less than pH 5.2, preferably to about pH 4.5, with a weak acid such as citric acid, crotonic acid, phosphoric acid, or an acid salt. The mixture is heated at about 160 to 210° F. and then cooled. The product may be diluted to stock concentration or may be extracted as a dry powder. Some other preparations of suitable boric acid complexes of polyvinyl alcohol are described in U.S. Pat. No. 3,135,648 issued June 2, 1964 to Raymond L. Hawkins. Some boric acid complexes of polyvinyl alcohol suitable for use in the novel processes are commercially marketed by Air Reduction Chemical and Carbide Company, New York, N.Y. under the trade names Unisize HA–70 and Tackified Polyvinyl Alcohol M–51, MM–81, MH–82, SM–53 and SM–73.

Boric acid complexes of polyvinyl alcohol impart a substantial resistance to blistering of the film during the baking-out step when used in concentrations of 0.2 to 1.0 weight percent of the acrylate solids present in the emulsion. Higher concentrations may be used but these higher concentrations modify the flow properties of the low viscosity filming emulsions. High concentrations also adversely affect the specular properties of the aluminum or other metal layer deposited over the dried film without significantly improving the blister resistance of the resin film.

Colloidal silica may be included in the filming emulsion in an amount up to about 25 weight percent of the acrylate solids present in the emulsion. The preferred range is about 1 to 10 weight percent. The silica may be in the form of an aqueous suspension with particles having an average particle size of about 15 millimicrons. Some suitable colloidal silica suspensions are available commercially under the trade name Ludox marketed by E. I. du Pont de Nemours, Wilmington, Del. The colloidal silica has the effect of reducing the peeling of the metal layer from bare glass areas after the baking-out step. It also reduces blistering of the resin film during the baking-out step to some extent. Where more than 25 weight percent of silica is added, the resin film leaves behind an excessive residue which interferes with the excitation process of the phosphor in the screen.

Soluble silicate may be included in the filming emulsion in an amount up to about 2 weight percent of the acrylate solids present in the emulsion. The preferred range is about 1 to 2 weight percent. Some useful silicates are sodium silicate, potassium silicate, and lithium silicate. The ratio of silica to cation in the soluble silicate is preferably in the range of about 2.0 to 4.0. Some suitable soluble silicates are available commercially under the trade name Kasil marketed by Philadelphia Quartz Company, Philadelphia, Pa. The soluble silicate has the effect of reducing the peeling of the metal layer from bare glass areas after the baking-out step. It also reducees to some extent the blistering of the resin film during the baking-out step. Also, the soluble silicate may be alkaline and, when that is the case, it may function as a neutralizing agent. In this role it may be the sole neutralizing agent in the filming emulsion or may be used in combination with another neutralizing agent. Where more than 2 weight percent of soluble silicate is added, the resin film may exhibit a reduced gloss resulting in metal layers with poorer specular properties.

The four additives may be included in the filming emulsion singly or in combinations of 2, 3, or 4. When used in combination, improvements in two or more respects may be achieved. Also a single additive may perform more than one function. For example, a soluble silicate such as sodium silicate or potassium silicate may be alkaline, providing a neutralizing effect upon the filming emulsion, thereby improving the spreading properties of the emulsion and, at the same time, reducing the tendency of the metal layer to peel from bare glass areas after the baking-out step. As another example, the boric acid complex reduces blistering of the film and, at the same time, reduces the tendency of the metal layer to peel from bare glass areas. Since each additive may produce improvements in more than one respect, the optimum amounts that may be added must be determined empirically for each filming emulsion.

The filming emulsions generally have a long shelf life. Mild agitation of the emulsion may be desirable during the time interval between mixing and use.

The novel filming method may be applied to any phosphor screen structure such as dot screens, line screens and penetration screens. Such screens may include nonluminescent areas such as guard bands or other masking structures. The novel filming method may be applied to phosphor screens comprised of any phosphor or combination of phosphors which have been fabricated by any screening process. Thus, the novel method may be applied to screens which have been fabricated by a dusting technique, a slurry technique, a settling technique, etc. The screen deposition technique may include the use of a photopolymer which is insolubilized or which is solubilized upon exposure to light or to electrons. In the case of phosphors deposited by the slurry direct photographic process, the filming emulsion may be applied over phosphor elements deposited from slurries containing, e.g., 12 to 26 weight percent phosphor solids and a ratio of polyvinyl alcohol to phosphor solids of about 0.09 to 0.40. The emulsions can be used to film phosphor screens prepared with slurry compositions disclosed in U.S. Pat. No. 3,269,838 granted to T. A. Saulnier, Jr.

The water-based filming emulsion described herein may be applied to either a wet or a dry phosphor screen in any of several ways, for example, by spraying, hosing, or slurrying. In applying a film of the emulsion over the screen surface, it is usually advantageous to apply a spinning motion to the screen during and after application of the emulsion in order to spread the material over the screen surface and to remove the excess emulsion. A speed of rotation up to about 120 r.p.m. can be used to adjust the spreading and the draining of the emulsion to achieve the substrate thickness and uniformity desired with the screen and the emulsion that is being used.

When the filming emulsion is to be applied directly to a wet phosphor screen, the water content of the screen is such that the binder holding the phosphor particles in the phosphor screen is preferably fully swelled with water but surface water is nearly all drained off. Generally, the lower the water content of the screen, the less emulsion will be diluted. Accordingly, when coating wet phosphor screens, the resins content of the filming emulsion should be adjusted to a somewhat higher concentration than for dry screens.

In applying the filming emulsion to the screen surface by the slurry technique, the emulsion is spread over the screen with a puddle of emulsion traveling in a spiral as the concave surface of the screen panel rotates and tilts from near horizontal through a 15 to 18° angle. It is then tilted quickly through an additional 75° to 85° to the vertical or just beyond in order to spin-off the excess emulsion while drying the emulsion to a nearly complete film with infrared heaters.

In practice, the emulsion wets the screen surface readily, and fills the screen pores or capillaries so that, upon heating and drying, the emulsion solids form a nearly tight film. Some resin emulsion solids are deposited over the phosphor elements due to inhibition of water from the emulsion. Variations in the texture and the size of the capillaries across the phosphor screen may require adjustment of the filming cycle and emulsion solids to optimize the performance of the filming step.

In making films with emulsions which have a "minimum film-forming temperature" above room temperature, sufficient heat should be applied to cause the film to dry rapidly in order to accumulate emulsion solids over the phosphor area, and to heat the screen, the screen support surface, and the emulsion to a temperature that will cause film formation. In practice, the measured film-forming temperature for the system depends on the particular room environment, developing water temperature for the last application of phosphor, resin emulsion concentration, and the "minimum film forming temperature" of the resin. It is usually easiest to approach the film-forming temperature from the low temperature side, then to apply a large enough change in the heating rate or duration of the heat to arrive at a significant change in the apparent cap surface temperature just before the emulsion film changes from a wet (low gloss) to a dry (no gloss) appearance.

After the deposition of an evaporated aluminum layer of 2000 to 4000 A., the "emulsion film" substrate can be examined by transmitted light with 10–50× magnification in order to check the porosity of the aluminum film. See "Emulsion Film for Color-Television Screens," T. A. Saulnier, Electrochemical Technology, vol. 4, No. 1–2, pages 31–34 (1966). In the case of three-dot color screens, an under-heated film will show full mosaic crazing or small cracks due to crazing over one or more phosphor dot element. In this case, the degree of heating is increased until the last color element to show film-forming has no cracks, but only pin holes of small to very small size. Usually the screen surface texture precludes easy measurement of the pin-hole size. However, the limit of low screen porosity can be quickly and decisively determined by "braking-out" the screen to determine whether or not any "blistering" of the aluminum is shown. This can be judged by the noticeable movement or change in aluminum film surface texture over the phosphor screen after bakeout.

For filming on europium activated yttrium or gadolinium oxide phosphor areas, the ammonium hydroxde neutralized emulsion (pH 6.8 to 7.5) results in less chemical attack on the phosphor and wets the screen well. Sometimes, the emulsion drains excessively during coating as compared with a corresponding unneutralized filming emulsion. This drainage can be improved by changing the emulsion application cycle so as to provide the desired drainage from the capillaries.

A filming schedule usable for dot screens of the rectangular 22 or 25 inch shadow-mask type starts on a screening conveyor directly after the last phosphor, usually the redemitting phosphor, has been applied to the cap or faceplate panel. The cap may pass through two to ten index positions where bands of infrared heaters dry the screen. The dried screen, which consists of phosphor powder in a photopolymerized binder, is then heated and maintained at about 40–46° C. just prior to receiving about a 100 ml. portion of neutralized Rhoplex B–74 emulsion. The cap, which may be rotating at 15 to 22 r.p.m. during the first part of cycle, slows to 7.5 to 8.5 r.p.m. to coat the corners of the rectangular cap, while the cap is held at about a 15 to 18° angle.

Once the corners are coated, the cap is tipped quickly (3–6 seconds) to an angle of 90° to 110° from the horizontal starting position, while rapidly accelerating the cap to a high speed to throw excess emulsion off the cap and level the coating. The initial speed and final speeds are selected to provide the desired screen texture.

In one case, a screen with a very coarse texture responded successfully when a 9% Rhoplex B–74 suspension was adjusted to pH 7 with $NH_4OH$ (also to pH 4.5 with morpholine) and applied with the following application cycle:

CYCLE 1

| R.p.m. | Sec. |
|---|---|
| 120 | 5 |
| 50 | 15 |
| 30 | [1] 1 |

[1] Braking prior to index.

The same emulsion applied with a single speed cycle of 110 r.p.m. for 20 seconds gave a low light output particularly in the phosphor screen color elements having the large capillaries, and coarse screen structure.

It has also been found possible due to improved wetting to reverse the order of applying the speeds using:

CYCLE 2

| R.p.m. | Sec. |
|---|---|
| 50 | 15 |
| 120 | 5 |
| 30 | [1] 1 |

[1] Braking prior to indexing.

This cycle has demonstrated some advantages of removing accumulated emulsion from the edge of the screen just prior to the film formation drying steps. This leads to a more even film porosity over the entire screen particularly when edge heating is marginal. All screen types may not accommodate the cycle reversal (Cycle 2) if the emulsion suspension solids was arrived at using spin-off Cycle 1. In this case, reduction of the emulsion solids or adjustment of the drying heaters can accommodate the film application using Cycle 2.

Following filming, the screen is metallized and then baked-out in a manner similar to that previously described; for example, in Pats. 2,903,377, 3,067,055, and 3,177,389 each issued to T. A. Saulnier, Jr. Briefly, one method consists of fixing short lengths of aluminum metal to a tungsten filament, placing the filmed screen above the filaments, evacuating the chamber between, and then evaporating the aluminum, which deposits as a metal layer on the film. Subsequently, the metallized screen is baked in air at about 400 to 400° C. During this baking, any organic matter in the screen and in the film is completely volatilized and the metal layer adheres to the phosphor screen. After baking-out, a small amount of inorganic residue is usually left by the film. The source of some of this residue may be the additives in the novel filming emulsions. Following baking-out, the cap with the metallized phosphor screen thereon is assembled with other structures into a cathode ray tube. Alternatively, the filmed screen may be assembled with other structures and baked-out as described above to volatilize any organic matter in the screen and in the film.

I claim:
1. A method of metallizing a phosphor screen which includes the steps of:
  (a) depositing upon said phosphor screen a volatilizable substrate from an aqueous emulsion of an acrylate copolymer, which copolymer is substantially entirely volatilized when heated in air at about 400 to 400° C., said emulsion containing at least one of:
    (1) a neutralizing agent selected from the class consisting of alkali hydroxides, alkali salts, ammonium hydroxide, and morpholine in sufficient quantity to adjust the pH of said emulsion to a pH in the range of 4.0 to 8.0,
    (2) a boric acid complex of polyvinyl alcohol in an amount up to about 1.0 weight percent of the acrylate solids present in said emulsion,
    (3) colloidal silica in an amount up to about 25 weight percent of the weight of acrylate solids present in said emulsion,
    (4) soluble silicate selected from the class consisting of sodium silicate, potassium silicate and lithium silicate in an amount up to about 2 weight percent of the acrylate solids present in said emulsion,
  (b) evaporating metal upon said substrate, and
  (c) volatilizing the organic matter in said substrate.
2. The method defined in claim 1 wherein said emulsion contains said neutralizing agent.
3. The method defined in claim 1 wherein said emulsion contains said boric acid complex in any amount of about 0.2 to 1.0 weight percent of said acrylate solids present.
4. The method defined in claim 1 wherein said emulsion contains said colloidal silica in an amount of about 1 to 10 weight percent of said acrylate solids present.
5. The method defined in claim 1 wherein said emulsion contains soluble silicate in an amount of about 1 to 2 weight percent of said acrylate solids present.
6. The method defined in claim 1 wherein said emulsion contains a nuetralizing agent, a boric acid complex of polyvinyl alcohol and a soluble silicate.
7. A method of metallizing a phosphor screen comprised of a multiplicity of areas of different phosphorus supported upon the inner surface of the faceplate of a cathode ray tube, which method includes the steps of:
  (a) depositing upon the surface of said phosphor screen a quantity of an aqueous emulsion of an acrylate copolymer, which copolymer is substantially entirely volatilized when heated in air at about 400 to 440° C., said emulsion normally having a pH or less than 4.0 and containing at least two of:
    (1) a neutralizing agent selected from the class consisting of alkali hydroxides, alkali salts, ammonium hydroxide, and morpholine in sufficient quantity to adjust the pH of said emulsion in the range of 4.0 to 8.0,
    (2) a boric acid complex of polyvinyl alcohol which is produced by reacting boric acid with polyvinyl alcohol in an acidic medium having a pH lower than 5.5 in an amount up to about 1.0 weight percent of the acrylate solids present in said emulsion,
    (3) colloidal silica in an amount up to about 25 weight percent of the acrylate solids present in said emulsion,
    (4) soluble silicate selected from the class consisting of sodium silicate, potassium silicate and lithium silicate in an amount up to about 2 weight percent of the acrylate solids present in said emulsion,
  (b) spreading said quantity over said screen surface to produce a thin layer of emulsion thereon,
  (c) drying said layer to form a thin film on said screen surface,
  (d) evaporating aluminum metal upon said film, and
  (e) volatilizing the organic matter in said film.
8. The process defined in claim 7 wherein said spreading includes spinning said faceplate about an axis substantially normal to said surface whereby said quantity moves outwardly by centrifugal action.
9. The process defined in claim 7 wherein ammonium hydroxide and sodium silicate have been added to the emulsion, and the pH thereof is between 6.8 and 7.5.

References Cited

UNITED STATES PATENTS

| | | | |
|---|---|---|---|
| 2,705,764 | 4/1955 | Nicoll | 117—217X |
| 2,756,167 | 7/1956 | Barnett | 117—217 |
| 2,998,331 | 8/1961 | Rigot et al. | 117—217X |
| 3,067,055 | 12/1962 | Saulnier | 117—107X |
| 3,278,326 | 10/1966 | McGee | 117—217X |

ALFRED L. LEAVITT, Primary Examiner

W. F. CYRON, Assistant Examiner

U.S. Cl. X.R.

117—35, 107

PO-1050
(5/69)

UNITED STATES PATENT OFFICE
CERTIFICATE OF CORRECTION

Patent No. 3,582,389            Dated June 1, 1971

Inventor(s) Theodore A. Saulnier

It is certified that error appears in the above-identified patent and that said Letters Patent are hereby corrected as shown below:

| | |
|---|---|
| Column 3, line 15 | "1000" should be --100-- |
| Column 4, line 75 | "Philadelphia, as under" should be --Philadelphia, Pennsylvania under-- |
| Column 9, line 4 | "400 to 400°C" should be -400 to 440°C-- |
| Column 9, line 22 | "400 to 400°" should be --400 to 440°-- |

Signed and sealed this 9th day of November 1971.

(SEAL)
Attest:

EDWARD M. FLETCHER, JR.
Attesting Officer

ROBERT GOTTSCHALK
Acting Commissioner of Patents